Sept. 28, 1971   W. F. SHARP, JR   3,608,180
COMPRESSED GAS STANDOFF FOR CLADDING
Original Filed Feb. 23, 1968
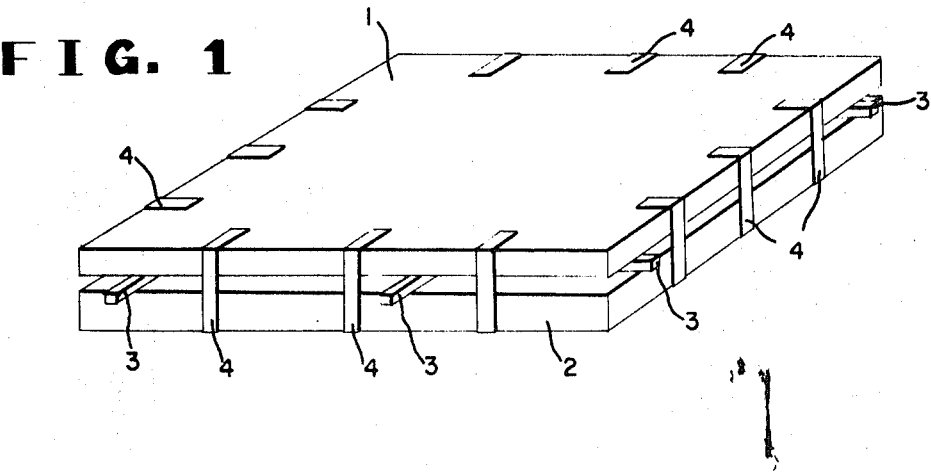
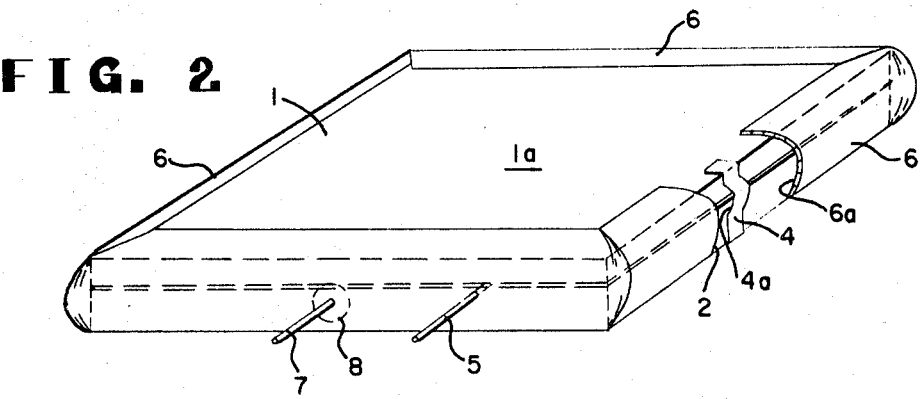
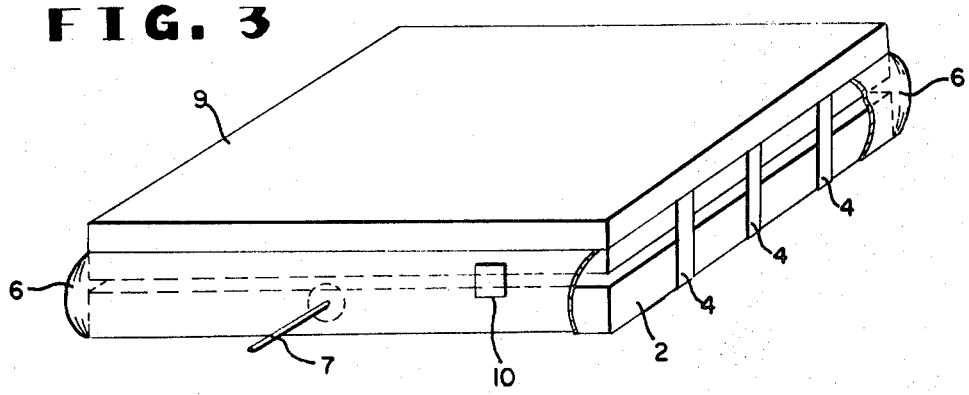
INVENTOR.
WILLIAM F. SHARP, JR.
BY
*Samuel S. Blight*
ATTORNEY _United States Patent Office_  3,608,180
Patented Sept. 28, 1971

3,608,180
COMPRESSED GAS STANDOFF FOR CLADDING
William F. Sharp, Jr., Bellmawr, N.J., assignor to E. I. du Pont de Nemours and Company, Wilmington, Del.
Continuation of application Ser. No. 707,522, Feb. 23, 1968. This application May 7, 1970, Ser. No. 35,437
Int. Cl. B23k 21/00
U.S. Cl. 29—470.1                5 Claims

ABSTRACT OF THE DISCLOSURE

In the process for metallurgically bonding metal layers by arranging them in spaced relationship and then explosively causing them to collide progressively under bonding conditions, the improvement comprising supporting the metal layers in such spaced relationship by means of an intervening inert gas.

BACKGROUND OF THE INVENTION

This invention relates to an explosion-bonding process employing a novel technique for supporting metal layers to be bonded in spaced-apart relationship. This application is a continuation of my copending application Ser. No. 707,522 filed on Feb. 23, 1968, now abandoned.

The past few years have witnessed the development and commercial acceptance of metallurgically bonded clad products made by explosion-bonding. Briefly, the explosion-bonding processes involve spacing metal layers from each other, placing a layer of detonating explosive adjacent to the outer surface of at least one of the metal layers and detonating the explosive in a manner such that the metal layers are caused to collide progressively. Such explosion-bonding processes are described in more detail in, e.g., U.S. Pats. 3,137,937 and 3,264,731, and in copending, coassigned U.S. patent application Ser. No. 503,261, the disclosures of which are incorporated herein by reference.

In many bonding operations the explosively driven metal (cladder) layer is positioned parallel, or at a small angle (preferably less than 10°), to a substantially horizontal metal (backer) layer. Consequently, the means used to maintain the initial spacing (standoff) between the cladder and backer layers must be capable of supporting the weight of the cladder and explosive layers. In some such cases, the requisite standoff can be maintained by using external supporting means, e.g., rods of proper length tack welded to the edges of the layers. Often, however, the cladder layer is so heavy or has such a large area that it may bow under its own weight alone, or under its own weight together with the weight of the explosive placed on it. In such cases, maintenance of a standoff in the desired range throughout the entire area of the surfaces to be bonded requires internal supports, i.e., supports that are placed between the layers.

Various internal support means have been employed to maintain the standoff between metal layers in explosion-bonding processes. These include small projections or protrusions on the surface of the layers to be bonded, solid metal powder particles, deformed thin metal ribbons standing "on edge," and rigid foamed plastic pieces. The latter are especially advantageous to use since they are consumed during the cladding process. Generally, the selection of a standoff technique for use in a specific case depends on the thickness of the metal layer to be supported, and therefore on the size of the standoff, as well as on the effect, if any, of the spacing means on the bond, and on the economics of preparing the cladding assembly. For a given area to be bonded, the larger the standoff, the greater the volume of support material required and the greater may be the effect of an internal support material on the bonding. For a given metal and explosive loading, larger standoffs are required with thicker metal layers to be driven to produce the proper steady-state collision angle needed for uniform bonding. As a rule, it becomes less desirable to employ internal supports to maintain the larger standoffs used with thicker driven metal layers, e.g., greater than about 0.250-inch-thick layers. Without internal supports, however, nonuniformities may be encountered in the case of heavy, large-area metal layers.

SUMMARY OF THE INVENTION

According to the explosion-bonding process of this invention, the initial spacing or standoff between the metal layers is provided by internal support, but without the need for positioning between the layers material(s) that might adversely affect the metallurgical bond. In particular, this invention provides an improvement in the process for metallurgically bonding initially spaced metal layers by explosively causing progressive collision of said layers at the surfaces to be bonded. The improvement is in the method providing the initial spacing between the metal layers and comprises introducing between such layers inert gas at a sufficient pressure to support them in the desired spaced relationship. The term "inert gas" as used herein denotes any gas which is inert with respect to its effect on the metals to be bonded under the conditions encountered during the bonding process.

BRIEF DESCRIPTION OF THE DRAWING

FIGS. 1 to 3 of the drawing illustrate a preferred sequence of steps for carrying out the process of this invention.

DETAILS OF THE INVENTION

In the explosion-bonding process of this invention, the cladder layer, i.e., the metal layer which is propelled or driven by means of the detonation of an explosive layer adjacent thereto, is supported by gaseous means. Thus the process provides an internal support, i.e., a force acting on the under surface of the driven metal layer in opposition to the weight thereof, without interposing between the surfaces to be bonded a solid material capable of deleteriously affecting the metallurgical bond. The great advantage of the gaseous support means is that it can be employed conveniently and without risk of contaminating the bond zone regardless of how large the standoff required.

A gas which is inert toward the metals to be bonded is admitted between the surfaces to be bonded, the pressure of the gas, and therefore the pressure exerted on the under surface of the cladder layer, exceeding atmospheric pressure, expressed in terms of weight per unit area, by at least the weight of the cladder layer and the overlying explosive assembly. A gas pressure equal to the weight of the cladder layer and explosive assembly (explosive layer, initiating means, any container for the explosive, etc.) will just balance the total downwardly directed pressure on the cladder layer. A balancing pressure or slight over-balance can be employed.

While the gas at superatmospheric pressure supports the cladder layer, means must be employed to restrict the extent of its motion away from the backer layer so that the predetermined spacing is not exceeded. A preferred way of providing the predetermined standoff is shown in FIG. 1, wherein 1 and 2 are the cladder and backer layers, respectively. To provide the desired standoff between the layers, short bars or rods 3, whose thickness is equal to the desired standoff, are placed at substantially even intervals around the edge of backer 2, and cladder 1 is lowered onto the bars. Following this, narrow strips of strong adhesive tape 4, e.g., a filament-type tape, are applied periodically along the edges of the plate assembly, the strips extending from the cladder plate's outside surface to the backer's outside surface and stretching taut across the standoff gap. Alternatively, cord or wire could be wrapped around the assembly. The bars are then removed and the cladder allowed to rest on small-diameter metal rod 5 and on the backer plate with the standoff strips slack, as shown in FIG. 2, while the remaining assembly steps are performed. The purpose of rod 5 will be explained below. The predetermined standoff also could be provided at the periphery of the metal layers by welding metal rods of the proper length to the edges of the metal layers.

After provision has been made to restrict the motion of the cladder layer when subjected to a gas at superatmospheric pressure so that the required standoff will be assured, the edges of the metal layer assembly are enclosed by flexible sealing means. Preferably this is done in the manner shown in FIG. 2, i.e., by applying wide strips of adhesive tape 6, e.g., one of the numerous commercially available vinyl-backed tapes, continuously along the edges of layers 1 and 2. Alternatively, a flexible seal can be provided by taping sheets of gas-impermeable material, e.g., a plastic, to the two outside surfaces. A sealing tape can be applied around the edges of the layers while one layer rests upon the other, as when the standoff strips described above are employed; or while the layers are already spaced apart, as occurs with welded standoff rods. Small-diameter metal rod 5, which has been left between the metal layers, protrudes through a small hole in the tape seal. It is preferred that the sealing tape not be taut when the layers are spaced apart, thereby affording a larger volume of superatmospheric pressure gas and better conditions for maintaining the required pressure. Where adhesive tape is used for strips 4 and seal 6, it generally is desirable to cover with paper the inner adhesive surfaces of the tape, e.g., at 4a and 6a, that are supposed to be inoperative. This precaution prevents unwanted sticking of the tape to itself and the edges of the metal layers. A hose-connecting stem 7 for the gas inlet can be fitted into an aperture in the tape seal and adhered to the back to the tape by a washer 8 that is soldered to the stem.

The gas can be introduced into the space between the metal layers at any time after the space is sealed off. However, the assembly is easier to handle if the explosive layer 9 (FIG. 3) is applied to outside surface 1a of the cladder layer prior to introduction of the gas. Before introducing the gas, the required pressure is determined as described above, i.e., from the total weight of the cladder layer and the explosive assembly. A slight overbalance of pressure, e.g., about 0.5–1.5 pound per square inch, preferably is employed to counteract frictional losses of pressure and to assist in the lifting of the cladder layer when the latter is initially at rest on the other layer. Large overbalances, e.g., about 2–4 pounds per square inch or more, are not required nor are they desirable since they place an unnecessary strain on the standoff restricting means. When the metal layers are initially in contact with each other, it is helpful in getting the gas to flow between the layers if a small-diameter (e.g., up to about ⅛ inch) rod or wire 5 is left between the layers to keep them slightly separated. The rod extends through the tape seal, as shown in FIG. 2, and is pulled out and the small hole sealed with patch 10 (FIG. 3) after the gas has been introduced into the space between the metal layers.

Any source of gas can be employed in the present process, e.g., a cylinder of compressed gas, together with pressure regulator. A rubber pressure hose can be connected to the pressure stem protruding from the sealing tape around the metal layer assembly, and the compressed gas source and regulator turned on and adjusted to the necessary pressure. As seen in FIG. 3, the gas inflates the assembly, i.e., lifts cladder layer 1 and explosive 9 as far as the restraining strips 4 permit, thus providing the desired standoff. When this has been achieved, the explosive is detonated and bonding accomplished as described in the aforementioned patents and co-pending patent application.

Any gas can be employed in the present process provided it is inert toward the metals to be bonded under the conditions used. For economical reasons, gases such as air and nitrogen are preferred, although such gases as helium, argon, etc., also can be employed.

The following examples serve to illustrate specific embodiments of the present process. However, they will be understood to be illustrative only and not as limiting the invention in any manner.

Example 1

An assembly for explosion-bonding a 48-inch by 48-inch 316L stainless steel plate ½-inch thick to a 48-inch by 48-inch carbon steel backer plate ¾-inch thick utilizing compressed nitrogen gas to support the stainless steel plate is prepared as follows:

Several metal spacer bars ⅜ inch square and 4 inches long are placed lengthwise on the backer plate, extending out over the edges of the plate. The stainless steel plate then is lowered onto the spacers in a manner such that the edges of the two plates are aligned. Along each of the plates' four edges, four strips of ½-inch-wide Type 890 "Scotch"-brand filament-backed adhesive tape are taped tightly to the stainless steel surface, then stretched across the ⅜-inch gap between plates and taped to the backer metal. These strips are spaced about 9 inches apart. After this, the spacers are removed, and the stainless steel plate is rested on the backer plate. A small metal rod which has been placed between the plates is left in place so that the gas to be employed can get between the plates to lift the stainless steel plate. Vinyl adhesive tape strips 4 inches wide then are applied lengthwise to the outer surfaces of both plates along all of their edges, the strips overhanging the edges by 3¼-inches. The edge of the plate assembly are sealed by causing corresponding ¾ inch outer portions of the tape overhangs on the two plates to stick to each other, the inner portions of the overhangs being kept separated by paper strips applied to the adhesive surfaces thereof. The single small rod protrudes through a hole in the tape seal. A hose-connecting stem, made by bracing a metal washer to one end of a short copper tube having a ¼-inch diameter, is placed in an aperture in the tape seal with the washer seated flush against the tape on the inside.

A sheet metal frame for holding a layer of granular explosive is taped onto the stainless steel plate, the frame overhanging the edge of the plate by 2 inches. A granular mixture of 44% ammonium nitrate, 11% trinitrotoluene, and 55% sodium chloride (all by weight) is packed into the frame so as to form a 2½-inch-thick layer detonating at a velocity of 2700 meters per second. The explosive layer weighs 344 pounds, the frame 6 pounds, and the stainless steel plate approximately 322 pounds. An initiator is affixed to the explosive layer at its center.

A rubber tube leading from a compressed nitrogen cylinder is clamped onto the connecting stem and the assembly is inflated by initiating the gas flow and adjusting the pressure so that the positive pressure (i.e., that in excess of atmospheric) is 1.5 pounds per square inch. The total weight of the plate and explosive assembly (672 pounds) is balanced by a positive gas pressure of 0.29 pound per square inch, the small additional pressure being employed to assist in the lifting of the assembly. The stainless steel plate is lifted and held firmly against the restricting filament-backed tape strips. The standoff distance between the plates is equal to the thickness of the spacers originally used, i.e., ⅜ inch. The small rod protruding through the tape seal is pulled out, and a piece of tape placed over the hole in the seal. While the plate and explosive assembly are supported in this manner, the explosive layer is initiated, and the stainless steel plate thus is caused to collide progressively with the backer plate. A strong metallurgical bond is obtained.

Example 2

The procedure of Example 1 is repeated with the exception that both plates to be bonded are low-carbon steel plates, and the cladder plate is ¼-inch-thick. The nitrogen gas pressure is 0.5 pound per square inch. Again, strong bonding is achieved.

Although this invention has been described with reference to bonding a single cladder layer to a backer layer, it is to be understood that the invention is equally applicable to providing one or all of the requisite standoffs for simultaneously bonding a plurality of cladder layers to a backer. For example, the aforementioned foamed plastic standoff could be used between two cladder (driven) layers, while standoff between an inner cladder layer and the backer is maintained by inert gas in the manner described in the preceding examples.

I claim:

1. Process for explosive bonding metal layers comprising the steps of:
   initially spacing the metal layers by introducing between them inert gas at sufficient pressure to support them in the desired spaced relationship, and
   explosively causing the metal layers to collide progressively under bonding conditions to bond the metal layers.

2. A process of claim 1 wherein the inert gas is air or nitrogen.

3. A process of claim 1 wherein lengths of tape are adhered to the edges of the metal layers so that they bridge said layers in a manner permitting them to be moved apart into said spaced relationship while preventing them from being spaced by more than the desired distance, and the inert gas is introduced between the metal layers until said lengths of tape become taut.

4. A process of claim 3 wherein the inert gas is maintained between the metal layers by a flexible seal that encloses the edges of said metal layers and the bridging lengths of said tape.

5. A process of claim 4 wherein the inert gas is air.

References Cited

UNITED STATES PATENTS

| | | | |
|---|---|---|---|
| 3,258,841 | 7/1966 | Popoff | 29—486 |
| 3,261,088 | 7/1966 | Holtzman | 29—486 |
| 3,419,951 | 1/1969 | Carlson | 29—486X |
| 3,543,382 | 12/1970 | Riegelmayer et al. | 29—494X |

JOHN F. CAMPBELL, Primary Examiner

R. J. SHORE, Assistant Examiner

U.S. Cl. X.R.

29—486, 493